United States Patent [19]

Longa et al.

[11] Patent Number: 5,208,647

[45] Date of Patent: May 4, 1993

[54] METHOD AND APPARATUS FOR THE OPTICAL MEASUREMENT OF AN ANGLE BETWEEN POSITIONS OF COMPONENTS RELATIVE TO EACH OTHER

[75] Inventors: Simone Longa, Arcisate; Marco Castelnuovo, Milan, both of Italy

[73] Assignee: Hofmann Werkstatt-Technik GmbH, Pfungstadt, Fed. Rep. of Germany

[21] Appl. No.: 802,645

[22] Filed: Dec. 9, 1991

[30] Foreign Application Priority Data

Dec. 13, 1990 [DE] Fed. Rep. of Germany ....... 4039881

[51] Int. Cl.$^5$ .............................................. G01B 11/26
[52] U.S. Cl. ..................................... 356/152; 356/141
[58] Field of Search ......................... 356/140, 141, 152

[56] References Cited

U.S. PATENT DOCUMENTS

| | | | |
|---|---|---|---|
| 3,574,466 | 4/1971 | Peters | 356/152 |
| 3,992,106 | 11/1976 | Auerbach | 356/141 |
| 4,029,415 | 6/1977 | Johnson | 356/141 X |
| 4,820,041 | 4/1989 | Davidson et al. | 356/152 X |
| 4,874,238 | 10/1989 | Ochi et al. | 356/141 X |
| 4,889,997 | 12/1989 | Tomiolo | 356/152 X |

Primary Examiner—Mark Hellner
Attorney, Agent, or Firm—Cushman, Darby & Cushman

[57] ABSTRACT

In a method and apparatus for the optical measurement of an angle between the positions of components relative to each other, such as the wheels of a motor vehicle, a light beam is directed along a first side of the angle to be measured towards the apex thereof and from there is transmitted at intervals of time which each correspond to a full 360° rotation for a first signal registration step at a first moment in time. A second light beam is directed along the second side of the angle to the apex thereof and from there is transmitted, relative to the respective first moment in time, with a time difference corresponding to the angle between the first and second light beams, for a second signal registration operation, at a second moment in time. The magnitude of the angle is calculated from the interval between the two signal registration operations.

20 Claims, 10 Drawing Sheets

METHOD AND APPARATUS FOR THE OPTICAL MEASUREMENT OF AN ANGLE BETWEEN POSITIONS OF COMPONENTS RELATIVE TO EACH OTHER

BACKGROUND OF THE INVENTION

There are various forms of methods and equipment for measuring an angle defined by positions of components relative to each other, for example the positions of the wheels of a motor vehicle. One such method which operates on an optical principle and an apparatus for causing out the method are to be found for example in U.S. Pat. No. 3,337,961, in which connecting lines between sensors fixed to the vehicle wheels are identified by means of light beams.

Instead of an optical measuring method and apparatus, there are also wheel position measuring methods and apparatuses in which the connecting lines between sensors fixed to the vehicle wheels are identified by means of cords or lines, as for example in U.S. Pat. No. 3,164,910.

With modern measuring equipment, the signals supplied by the above-mentioned sensors are evaluated electronically, using a computer, and the corresponding angles or wheel positions are thus appropriately measured, as disclosed for example in U.S. Pat. Nos. 4,239,389 and 4,265,537.

Although the measuring methods and apparatuses which involve the use of cords or lines for ascertaining for example motor vehicle wheel positions can embrace relatively large angular ranges of ±45° and more, the cords which identify the mechanical connecting lines between the sensors can give rise to difficulties. Such difficulties may be due to oscillations performed by the cords, while in addition the cords tend to suffer from friction and unintentional deflection effects. That can result in a hysteresis effect and under some circumstances may also result in measurement errors. Such apparatuses therefore require that the operating personnel carry out the method in an extremely careful fashion if the measurement results are not to be seriously falsified. While the cord-less or optical measuring methods and apparatuses do not suffer from the above-mentioned difficulties resulting from the mechanical considerations concerned with cords, such as hysteresis effect, frictional forces and unintentional deflection, the angular measurement range involved with such optical methods and apparatuses is extremely limited and in known equipment is only a maximum of ±10°. It is therefore necessary to use additional sensors on turntables or the like in order to cover larger angular ranges, for example the maximum steering control deflection of the front wheels of a motor vehicle.

SUMMARY OF THE INVENTION

An object of the present invention is to provide a method of optically measuring an angle which positions of components, such as wheels on a motor vehicle, have relative to each other, which permits a large angular range to be covered with a high degree of accuracy.

Another object of the present invention is to provide a method of optically measuring an angle between positions of components such as vehicle wheels, which ensures accurate results with a high degree of measurement resolution and a reduced level of apparatus expenditure.

Still another object of the present invention is to provide an apparatus for optically measuring an angle between positions of components, such as vehicle wheels, relative to each other, which is of a simple construction but nonetheless affords a high level of measurement accuracy and a high degree of operational reliability.

Yet another object of the present invention is to provide an apparatus for optically measuring an angle between positions of components such as vehicle wheels, which can cover a large angular range with a high degree of measurement resolution and accuracy.

In accordance with the principles of the present invention, in a first aspect, the foregoing and other objects are achieved by a method of optically measuring an angle between positions of components, relative to each other, wherein a first light beam is emitted along a first leg or side of the angle to be measured, in a direction towards the apex of the angle, and from there passed on at given intervals of time which each correspond to a full 360° rotation for a first signal registration operation at a first moment in time. A second beam is directed along the second leg or side of the angle to be measured, to the apex of the angle, and from there is passed on, relative to the respective first moment in time, with a time difference which corresponds to the angle between the two beam directions, for a second signal registration operation, at a second moment in time. The magnitude of the time angle is calculated from the spacing between the two signal registration operations.

In a further aspect of the invention, the foregoing and other objects are achieved by an apparatus for the optical measurement of an angle between positions of components, such as vehicle wheels, relative to each other, comprising a first light beam source for the emission of a first light beam along a first leg or side of the angle to be measured, the first light beam being directed towards the apex point of the angle, and a second light beam source for the emission of a second light beam along the second leg or side of the angle to be measured, the second light beam being directed towards the apex point of the angle. The apparatus further includes an aperture means which, in use of the apparatus, is disposed at the apex point of the angle to be measured and which at least in the plane of the angle to be measured passes with a narrow transmission region for the light emitted from the respective light sources, over a full 360° rotation. A light receiver is disposed in the beam path of the light which has passed through the transmission region of the aperture means, for receiving said light, while connected to the light receiver is a signal registering means for registering respective output signals produced by the light receiver. Connected to the signal registering means is a calculating means for calculating the angular spacing between the two legs or sides of the angle, from the registration spacing in respect of the signals registered in the signal registering means.

It will be seen that the invention provides that angle measurement is based on the principle of light beams which are detected at intervals of time from each other. The time intervals between the light beams correspond to the magnitude of the respective angle to be measured. The time interval or the angle to be measured can thus be registered, while for example the time interval can be detected by a counting operation, by a length measurement operation, by registration spacings in memory or storage devices, or the like. The situation involves registered signals, the spacings of which can then be evaluated with computer aid for ascertaining the value of the angle to be measured.

As will be seen in greater detail hereinafter, the method and apparatus according to the invention can be used in relation to a wheel position measuring method and apparatus, in particular for measuring the positions of the wheels of a motor vehicle.

For that purpose, in a condition of being associated with each vehicle wheel, a first light beam source is arranged in a position in line with the axis of the respective wheel. The first light beam source emits a light beam along the line extending the axis of the wheel, which forms the first leg or side of the angle to be measured. That light beam may form a reference light beam. Accordingly the first light beam source can be referred to as the reference light source. That first light beam or reference light beam is directed on to the abovementioned aperture means which is also disposed in alignment with the axis of the respective wheel and which performs its aperture function at the apex of the angle to be measured.

In addition, associated with each vehicle wheel are two second light beam sources of which the one directs its light beam rearwardly relative to the longitudinal direction of the vehicle while the other directs its light beam forwardly relative to the longitudinal direction of the vehicle.

In addition, associated with each vehicle wheel is a fixed mirror which, in the case of a respective front wheel, receives the light beam from the forwardly directed light source and which, in the case of a respective rear wheel, receives the light beam from the rearwardly directed light source.

The rearwardly directed light source which is associated with a respective front wheel also directs its light beam on to the aperture means which is disposed in line with the axis of the rear wheel at the same side of the vehicle, and the forwardly directed light source at the respective rear wheel directs its light beam on to the aperture means which is disposed in line with the axis of the respective front wheel at the same side of the vehicle. That arrangement provides a wheel position measuring apparatus operable to provide measurements in a horizontal plane for a vehicle, more especially a motor vehicle. The aperture means used is preferably a rotating aperture means which rotates at a constant speed of rotation. A time standard for a full rotation of 360° which can be divided practically as desired may be obtained in a simple fashion from an aperture means of that kind. The aperture means has a passage for transmission of the respective light beam from the light sources in such a way that, whenever that transmission region is at the angular position of the respective light beam, the light beam is transmitted to the light receiver. The various light beams therefore reach the light receiver at moments in time which are different from each other and are accordingly registered in the signal registering means and recorded so that they can then be evaluated with computer aid for calculating the angle to be measured.

Further objects, features and advantages of the present invention will be apparent from the following description of preferred embodiments.

DESCRIPTION OF PREFERRED EMBODIMENTS

Figure 1:
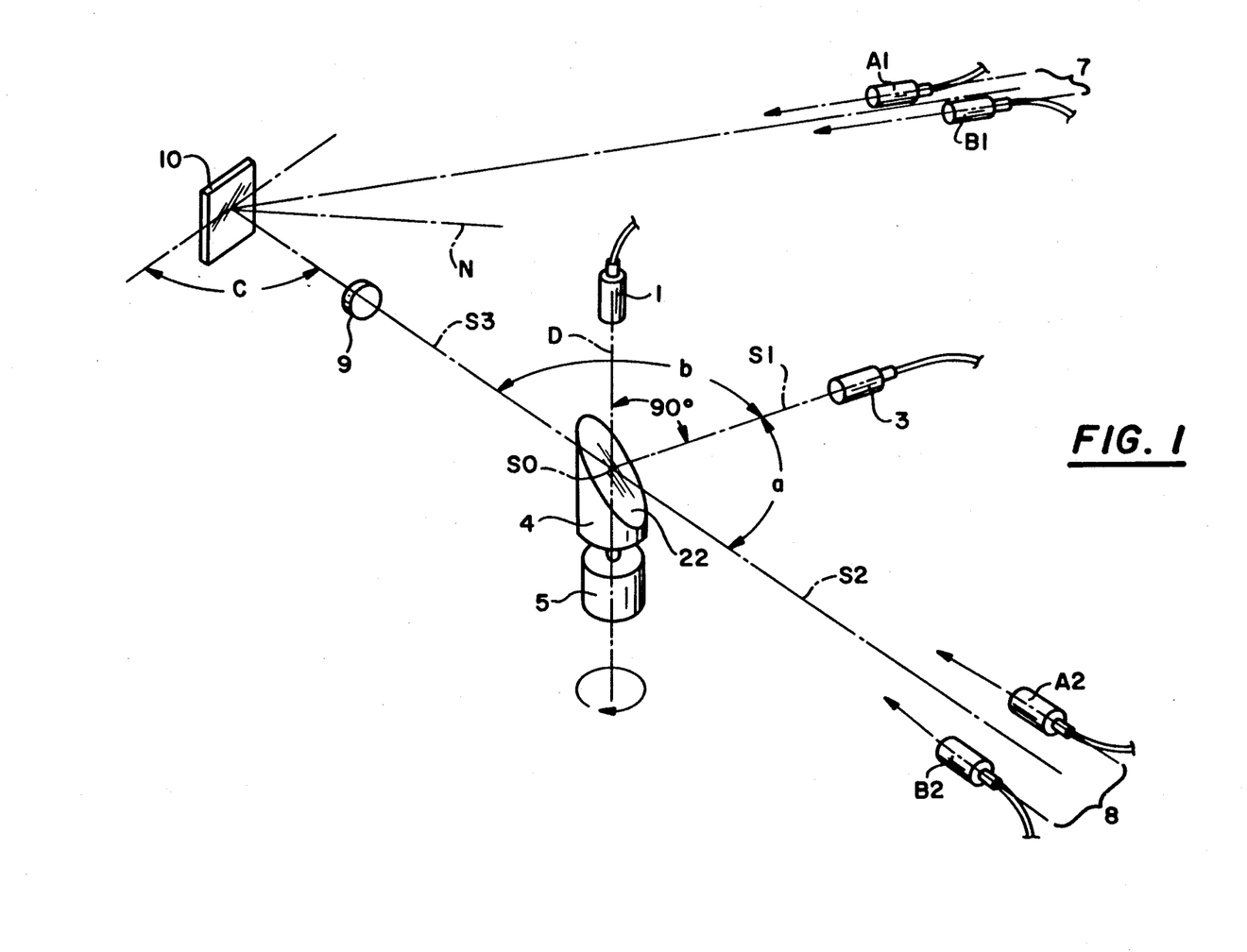
FIG. 1 is a diagrammatic perspective view showing the structure of a first embodiment of an optical angle measuring apparatus according to the invention.

Referring firstly to FIG. 1, shown therein in highly diagrammatic form is an apparatus for the optical measurement of an angle which positions of components such as the positions of wheels on a motor vehicle have, relative to each other, representing an embodiment of the present invention. The illustrated apparatus serves to measure first and second angles a and b which may be disposed in a horizontal plane or in a vertical plane or in a plane which is therebetween and which is thus inclined.

The illustrated apparatus includes a first light beam source 3 which emits a light beam along a first leg or side S1 of the angle a or the angle b respectively to be measured. That light beam forms a reference light beam so that the light beam source 3 also acts as a reference light emitter.

Disposed at the apex point SO of the angle a or b is an aperture means which in the illustrated embodiment comprises a rotary mirror 4. The rotary mirror 4 is driven at a constant speed of rotation by means of a motor 5 which may be a dc motor, a stepping motor or the like. The apex point SO is disposed on a reflecting surface 22 of the rotary mirror 4.

The rotary mirror 4 or its reflecting surface 22 is turned about the axis of rotation D by the motor 5 at a constant speed. The reflecting surface 22 is arranged inclinedly relative to the axis of rotation D and is preferably at an angle of 45° relative to the axis of rotation D, as can be clearly seen from FIG. 5. The apex point SO of the angle a or the angle b lies on the axis of rotation D of the reflecting surface 22. As can be seen more especially from FIGS. 1 through 4, the reference beam which is directed along the leg or side S1 of the angle to be measured, from the light beam source 3, extends at a right angle to the axis of rotation D and impinges on the reflecting surface 22 of the rotary mirror 4 at the apex point SO. The axis of rotation D extends at a right angle to the plane in which the angle a or b to be measured lies.

A second light beam source 8 emits a light beam along the other leg or side S2 of the angle a to be measured, that light beam being directed on to the apex point SO on the reflecting surface 22. In the illustrated embodiment of the apparatus according to the invention the second light beam source 8 comprises first and second light emitters A2, B2 which are directed towards the apex point SO of the angle a to be measured.

For the purposes of measurement of the angle b, a light beam which is emitted by another second light beam source 7 is directed on to the apex point SO along the leg or side S3 of the angle b. In the illustrated embodiment, that light beam is also produced by two light emitters A1, B1. The light beams from the two emitters A1 and B1 are directed on to a stationary mirror 10 and from there are reflected in a direction towards the apex point SO of the angle b to be measured, along the leg or side S3. A polarising device 9 may be disposed in the path of the light beam along the leg or side S3 of the angle b to be measured.

It is also possible for the second light beam source 7 comprising the first and second emitters A1 and B1 to emit light beams directly along the leg or side S3 towards the apex point SO which is disposed on the reflecting surface 22 of the rotary mirror.

A light receiver 1 is disposed in line with the axis of rotation D of the rotary mirror 4, being arranged above the rotary mirror 4 in the FIG. 1 embodiment. The light receiver 1 receives the light which is reflected by the reflecting surface 22. The reflecting surface 22 rotates continuously at a constant peripheral speed through a full angle of 360°. In that movement, the reflecting surface 22 adopts, for each of the light beams which are directed along the legs or sides S1 and S2 or S3 respectively, once per full angular revolution, a position in which the respective light beam is reflected by the reflecting surface 22 towards the light receiver 1. The difference in time between reflection of the light beam along the leg or side S1 and reflection of the light beam along the leg or side S2 or S3 respectively towards the light receiver 1 depends on the size of the angle a or b respectively to be measured and the known speed of rotation of the rotary mirror 4. It is therefore possible to ascertain the value of the angle a or b to be measured by detecting that time difference.

Figure 2:
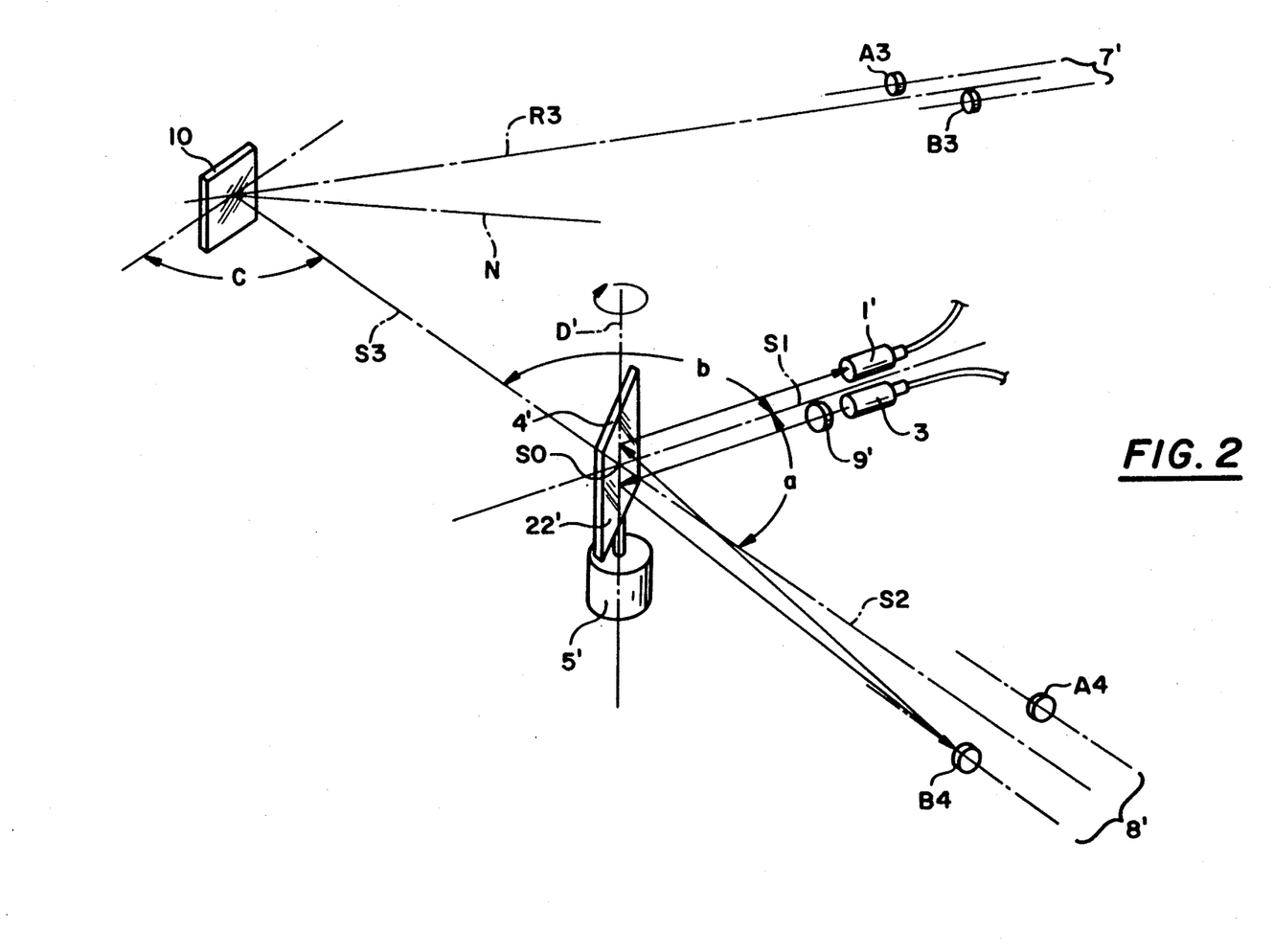
FIG. 2 is a diagrammatic perspective view showing the structure of a second embodiment of an optical angle measuring apparatus in accordance with the invention.

Reference is now made to FIG. 2 showing a further embodiment of an optical angle measuring apparatus according to the invention. In this apparatus, as a modification from the embodiment shown in FIG. 1, a light receiver 1' is oriented in parallel relationship to the first leg or side S1 of the angle a or b to be measured, or parallel to the reference beam emitted by the first light beam source 3. A rotary mirror indicated at 4' also has a rotating reflecting surface 22' at which the apex point SO of the respective angle a or b to be measured is disposed. However, unlike to the FIG. 1 embodiment, the reflecting surface 22' extends perpendicularly to the plane in which the respective angle a or b to be measured is disposed. Furthermore, the axis of rotation D' of the rotary mirror 4' is at the reflecting surface 22'. The rotary mirror 4' is also driven by a motor as diagrammatically indicated at 5'.

While the embodiment shown in FIG. 1 has light beam emitters A1, B1 and A2, B2 as the second light beam sources 7 and 8, reflectors A3, B3 and A4, B4 are used as the second light beam sources 7' and 8' in the embodiment shown in FIG. 2. Those reflectors reflect the light beam which is emitted by the first light beam source 3 and reflected by the rotary mirror 4'.

The measuring apparatus shown in FIG. 2 operates in the following manner for measurement of the respective angles a and b.

The light beam which is emitted by the first light beam source 3 along the leg or side S1 of the respective angle to be measured is possibly focussed by a lens system 9' and/or modulated. That light beam is directed on to the rotary mirror 4'. If, during the rotary movement of the rotary mirror 4', the reflecting surface 22' is in the reflection position relative to the first leg or side S1 of the angle to be measured, that is to say if the leg or side S1 is perpendicular to the reflecting surface 22', the emitted light beam is reflected back along the leg or side S1 and goes to the light receiver 1'. During the further rotary movement of the rotary mirror 4', the reflecting surface 22' moves into a position in which the light beam emitted by the first light source 3 goes towards the reflector A4 of the second light beam source 8'. From there the light beam is reflected back on to the reflecting surface 22' and from there directed along the first leg or side S1 on to the light receiver 1'. In the course of further rotary movement of the rotary mirror 4', the light beam which is emitted by the first light beam source 3 is deflected by way of the reflecting surface 22' on to the reflector B4 and reflected back from same and, as described, passed to the light receiver 1'. In the same manner as in the first embodiment shown in FIG. 1, the reflected light beams are received by the light receiver 1' at different moments in time.

Instead of the two reflectors A4 and B4 forming the second light beam source 8', the arrangement may also have only one reflector which is disposed in the second leg or side S2 of the angle a to be measured.

In the same manner, the light beam emitted by the first light beam source 3 is reflected at the corresponding reflection positions by the reflectors A3 and B3 forming the second light beam source 7', by way of the fixed mirror 10. It is also possible to provide only one reflector in the direction indicated by R3, for the second light beam source 7'. The direction R3 is at the same angle, relative to the line N normal to the surface of the fixed mirror 10, as the second leg or side S3 of the angle b to be measured.

In the same fashion as in the embodiment shown in FIG. 1, it is possible with the embodiment shown in FIG. 2 to ascertain the magnitude of the respective angle a or b to be measured, by detecting the time difference between the light beams received by the light receiver 1'.

That will now be described in greater detail with reference to FIGS. 3 and 4.

Whenever the plane of the angles of incidence and reflection are perpendicular to the reflecting surface in FIG. 1, a respective beam is reflected along the legs S1, S2 or S3 respectively towards the light receiver 1. In the second embodiment as shown in FIG. 2, the light receiver 1' receives reflected beams whenever the line normal to the reflecting surface 22' forms the bisector of the respective angle between the reference leg or side S1 and the respective reflectors A3, B3, A4, B4. If reference is made to FIG. 5, it will be seen therefrom that the rotary mirror 4 is in a position in the situation where the reference beam emitted by the first light beam source 3 is reflected to the light receiver 1. The light receiver 1 produces an electrical output signal in pulse form, in dependence on the received light beam. FIG. 3 shows a pulse output signal of that kind, at the time tR1. In FIG. 2, the light beam is reflected back along the reference leg or side S1 at that time tR1. When, in the course of subsequent rotary movement, the rotary mirror 4 or 4' and its reflecting surface 22 or 22' respectively has passed through a full angle of 360°, that gives the same positioning of the rotary mirror relative to the first light beam source 3 and the light receiver 1 so that once again a reference beam is reflected to the light receiver 1 and the light receiver 1 produces a further output signal. That pulse output signal is shown in FIG. 3 at the time tR2. The difference in terms of time between the two pulses occurring at the times tR1 and tR2 is indicated by tR. That difference in time tR, which can also be referred to as the time standard, corresponds to a full angle of 360°.

Figure 3:
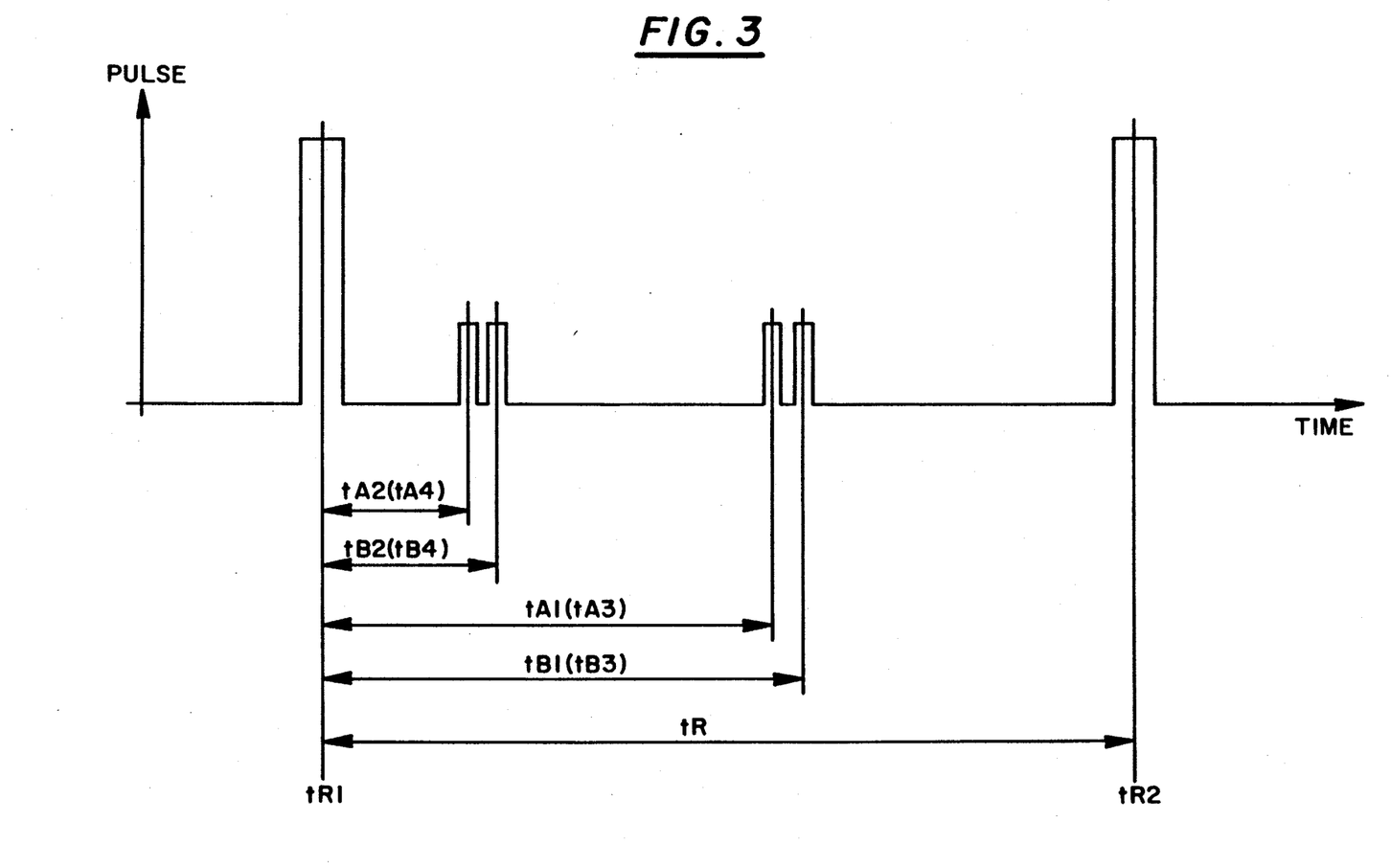
FIG. 3 illustrates electrical sender signals which are outputted by a light receiver used in the embodiments of the apparatus of the invention as shown in FIGS. 1 and 2.

When the rotary mirror assumes its respective reflecting positions in which it reflects to the light receiver 1 or 1' the beams emitted by the emitters forming the second light beam source 8 or 8' respectively, the pulses produced at the time intervals tA2, tA4 and tB2, tB4 respectively at the time tR1 are supplied as output signals by the light receiver 1 or 1', as can be seen from FIG. 3. Furthermore, at time intervals tA1, tA3 and tB1, tB3, at time tR1, pulses are produced as output signals by the light receiver 1 or 1' when the rotary mirror 4 or 4' and its reflecting surface 22 or 22' assumes the corresponding reflection positions. As the time differences tA2, tA4 and tB2, tB4 and the time differences tA1, tA3 and tB1, tB3 correspond to the magnitude of the respective angle a or b to be measured, those angle magnitudes can be ascertained, for the FIG. 1 embodiment, in accordance with the following relationships:

$$a = \frac{(tA2 + tB2)/2}{tR} \times 360°$$

$$b = \frac{(tA1 + tB1)/2}{tR} \times 360°$$

For the FIG. 2 embodiment, the relationships are as follows:

$$a = \frac{(tA4 + tB4)/2}{tR} \times 720°$$

$$b = 360° - \frac{(tA3 \times tB3)/2}{tR} \times 720°$$

Figure 4:
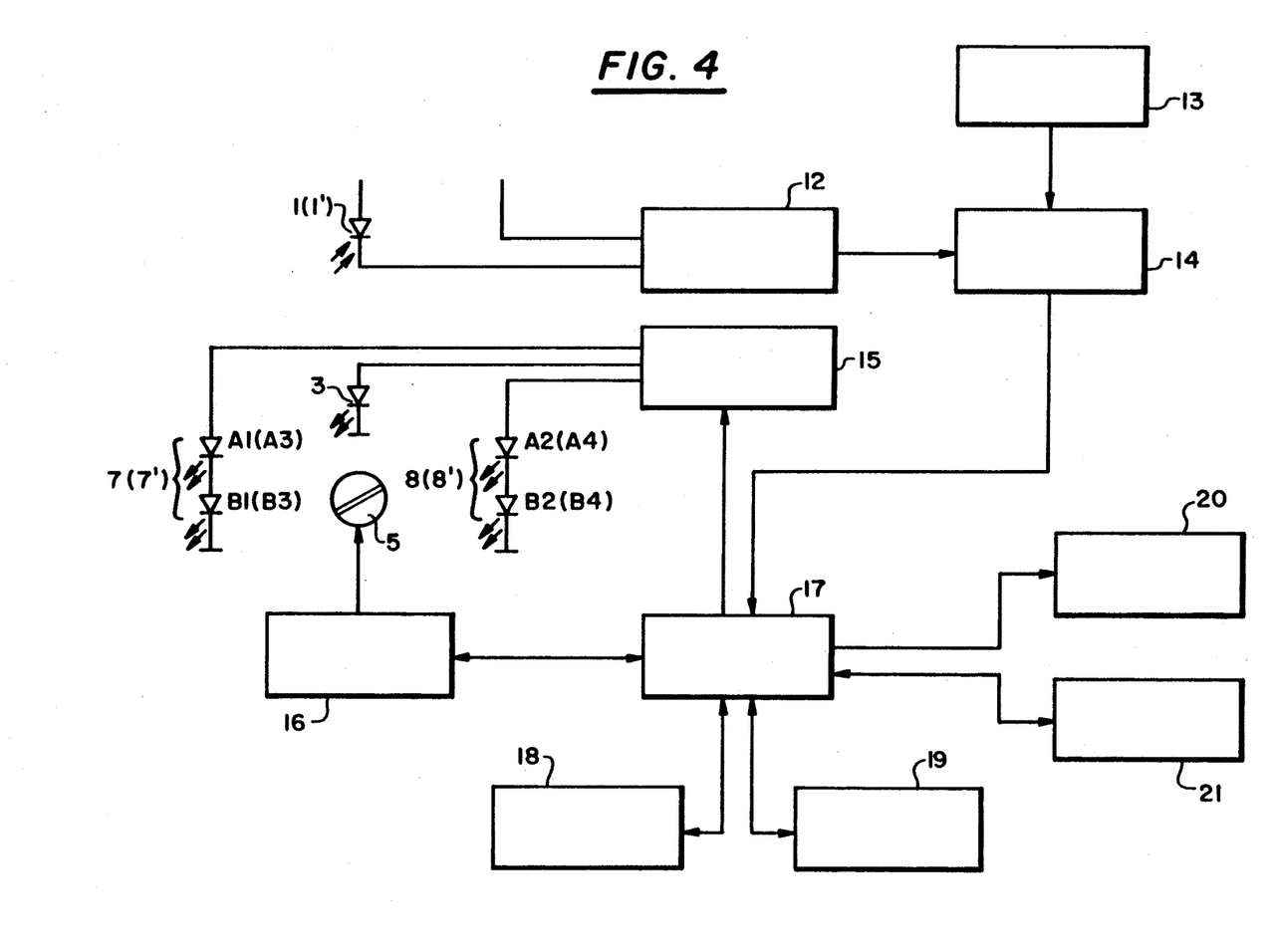
FIG. 4 illustrates a block circuit diagram for an evaluation means for the signals outputted by the light receiver and for the production of light beams which are required for angle measurement purposes in the apparatuses illustrated in FIGS. 1 and 2.

Referring now to FIG. 4, it will be seen therefrom that the light beams emitted by the light beam sources 3, 7, 7' and 8, 8' can be modulated in a suitable fashion by means of a modulator indicated at 15. For that purpose, suitable polarising devices such as for example the polarising device indicated at 9 in FIG. 1 or 9' in FIG. 2 can be disposed in each of the beam paths. It is also possible however to provide suitable filters and the like. That ensures that interference radiation from the surroundings is not transmitted to the light receiver 1 or 1'. Therefore a suitable demodulator 12, for example a filter, is connected to the output of the light receiver 1 or 1', as is also shown in FIG. 4.

Connected to the output of the demodulator 12 is a latching circuit 14 which, at the time of a respective pulse shown in FIG. 3, holds a count value which is supplied by a counter 13 and passes it for storage by way of a processor 17 to a storage device or memory 18.

The data which are stored in the memory 18 and which correspond to the time differences tR, tA2 (tA4), tB2 (tB4), tA1 (tA3), and tB1 (tB3) are evaluated in accordance with the above-indicated equations for calculation of the angles a and b in the processor 17. That procedure is repeated with each revolution of the rotary mirror 4 or 4', the rotation of the rotary mirror being controlled by a motor control device indicated at 16, which is connected to the processor 17. The operating mode of the processor 17 is controlled by a control unit 21.

A reference memory 19 is also connected to the processor 17. The reference memory 19 may contain for example average values of previously calculated angle values. Continuous averaging means that it is possible to achieve angle calculation of the highest possible accuracy, in a plurality of successive cycles. The angle values obtained are then passed from the processor 17 to a data output means 20 from which the calculated angle values can be taken.

Figure 5:
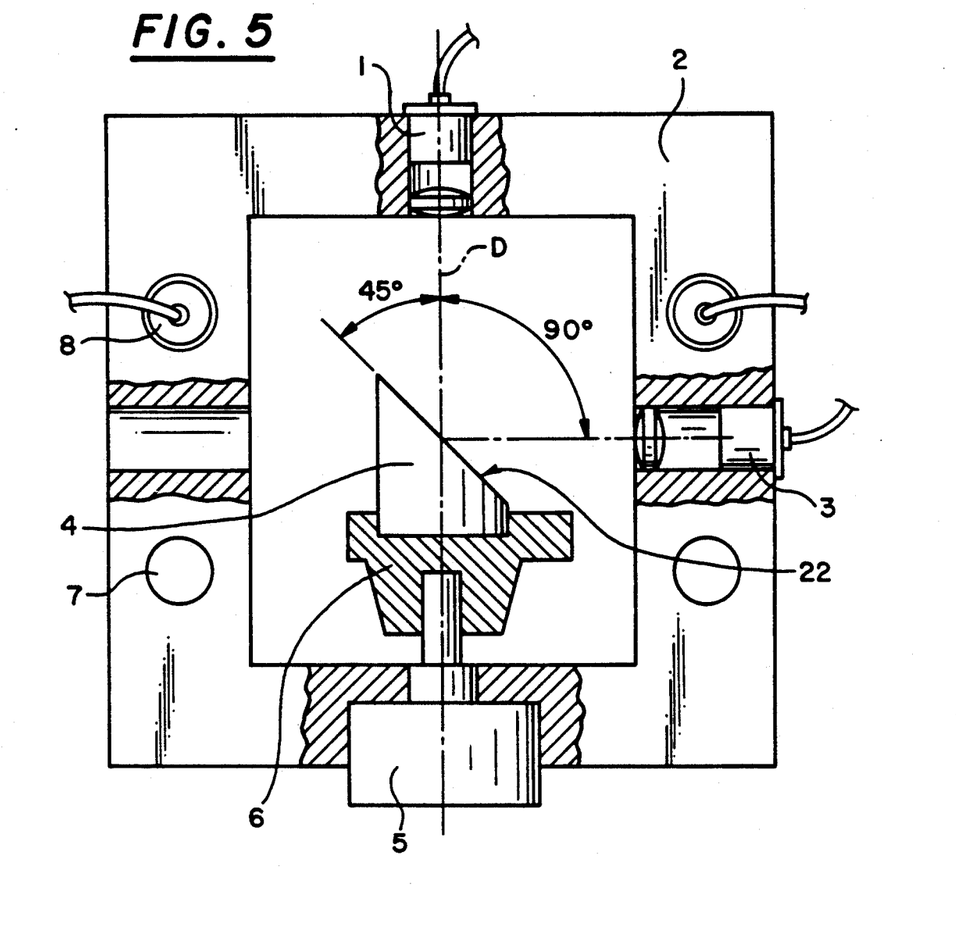
FIG. 5 shows an embodiment of a sensor device which can be used in a wheel position measuring apparatus operating in accordance with the principles of the invention.
Figure 6:
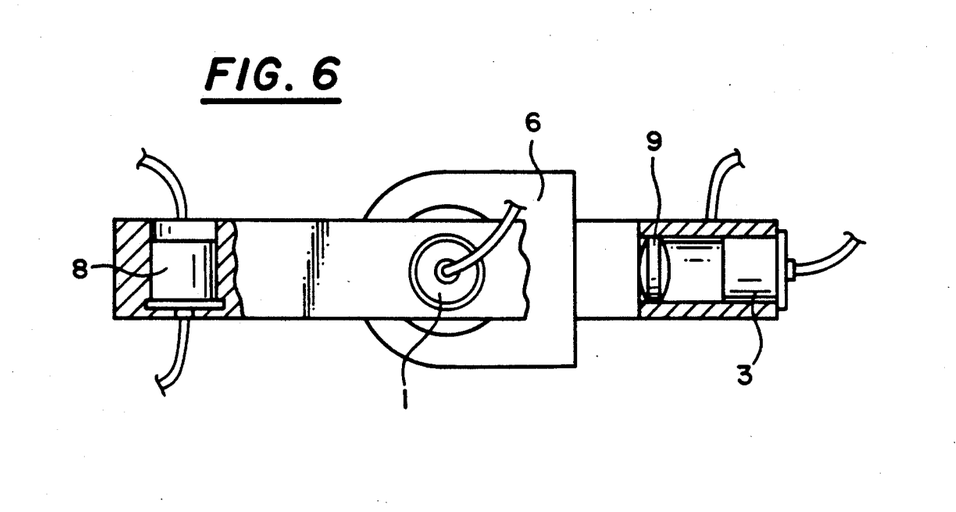
FIG. 6 is a plan view of the device shown in FIG. 5.

Reference will now be made to FIGS. 5 and 6 showing an embodiment of a sensor device which can be used in a wheel position measuring apparatus constituting an embodiment of the present invention, being used in a method of measuring the positions of wheels on a vehicle such as a motor vehicle. The device shown in FIGS. 5 and 6 therefore forms a sensor unit which can be associated with a respective vehicle wheel, in a fashion which will be described in greater detail hereinafter.

The sensor unit shown in FIGS. 5 and 6 has, as a reference beam source, the first light beam source 3 for emission of a reference beam along the reference leg or side S1 of the respective angle a or b to be measured. The sensor unit also comprises the rotary mirror 4 which is mounted in a rotary support 6. The rotary support 6 is driven at a constant speed of rotation by a motor diagrammatically indicated at 5, which can be a dc motor, a stepping motor or the like. The light receiver 1 is disposed in line with the axis of rotation D. The light-receiving surface of the light receiver 1 is directed on to the reflecting surface 22 of the rotary mirror 4. When the reflecting surface 22 is in the position shown in FIG. 5, relative to the light beam source 3, that is to say when the plane of the angle of incidence and reflection is perpendicular to the reflecting surface 22 and in addition the laws of reflection in respect of the light receiver 1 and the light beam source 3 are fulfilled, the reference beam emitted by the light beam source 3 is reflected on to the light receiver 1. In the illustrated embodiment the incident reference beam and the reflected reference beam form an angle of 90°. In other words, the reference beam is directed on to the reflecting surface 22 of the rotary mirror 4, at an angle of 90° relative to the axis of rotation D. The same arrangement is used for the other light beam sources if the light beams thereof, as shown in FIG. 1, are reflected towards the light receiver 1.

In the embodiment shown in FIGS. 5 and 6, the second light beam sources 7 and 8 are mounted on a frame-light support arrangement 2 together with the light receiver 1 and the light beam source 3. The second light beam sources 7 and 8 are so arranged that the two emitters A2, B2 associated with the light beam source 8 emit their light beams in a forward direction while the emitters A1 and B1 associated with the other second light beam source 7 emit their light beams in a rearward direction.

It will be appreciated that the FIG. 2 arrangement of the light source 3, the light receiver 1', the rotary mirror 4' and the reflectors may be provided in a support structure corresponding to the frame-like support arrangement 2 shown in FIG. 5.

Figure 7:
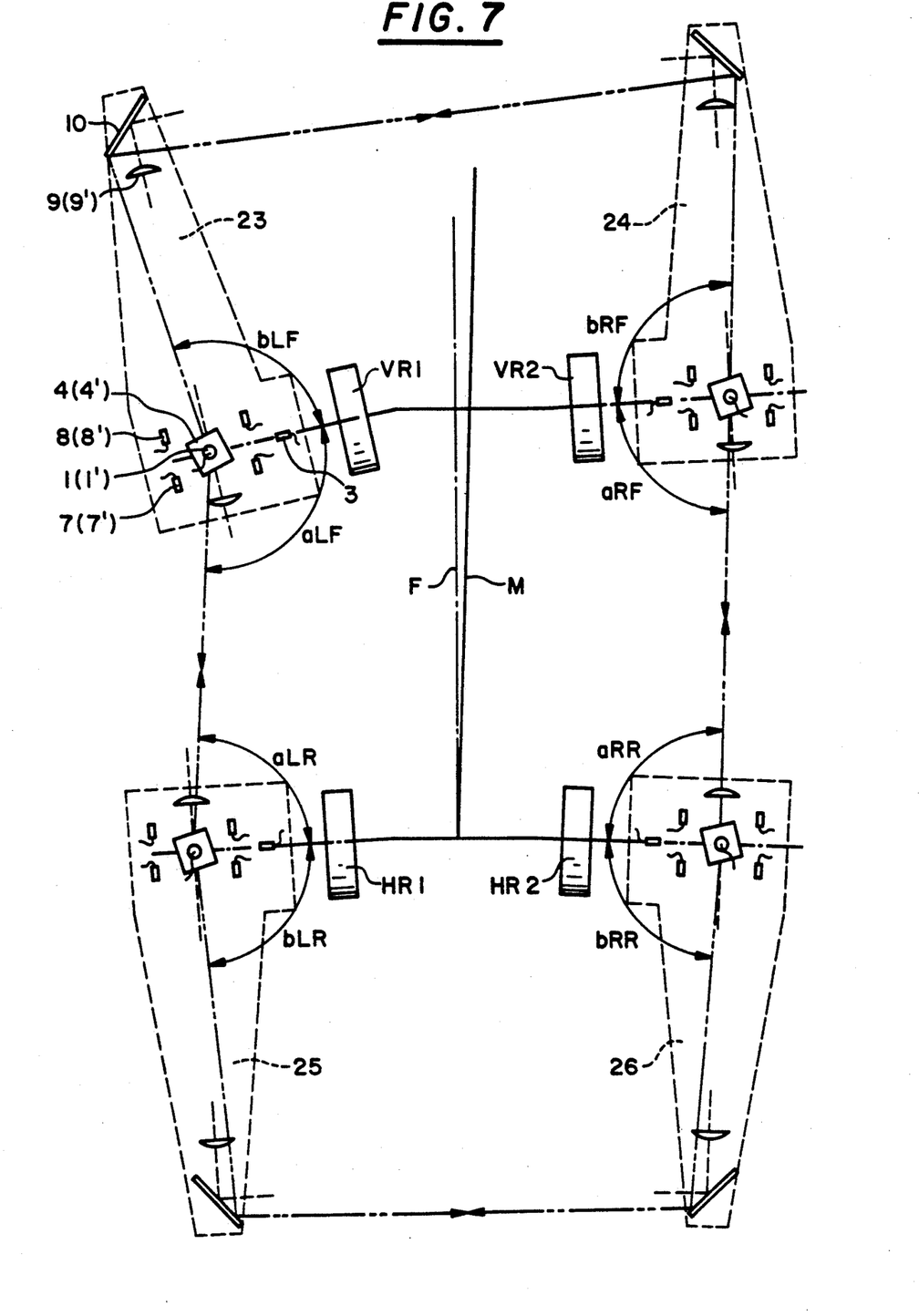
FIG. 7 shows an embodiment of a wheel position measuring apparatus operating in accordance with the principles of the present invention.

The light beams emitted by the second light beam sources 7 and 8 respectively impinge on rotary mirrors of sensor devices which are associated with the other wheels of the motor vehicle so that corresponding angles for determining the wheel positions are calculated using the procedure described above with reference to FIGS. 1 through 4. For that purpose, as shown in FIG. 7, a respective fixed mirror 10 is provided for each sensor device associated with a vehicle wheel VR1, VR2 (front wheels) and HR1, HR2 (rear wheels). In the case of the sensor devices for the front wheels VR1 and VR2, which form structural units 23 and 24, the fixed mirrors 10, as viewed in the longitudinal direction of the motor vehicle, are positioned in front of the front axle or the axes of the two front wheels VR1, VR2. The two light beams emitted by the emitters of the forwardly directed second light beam source form an angle and impinge on the fixed mirror 10. The bisector of that angle in the horizontal plane is disposed at an angle of 45° relative to the line N normal to the reflecting surface of the fixed mirror 10. That angle is for example equal to the magnitude of the angle indicated at c in FIG. 1.

FIG. 7 shows an arrangement of optical measuring devices for forming a wheel position measuring apparatus for use in relation to motor vehicles. A respective structural unit 23, 24, 25, 26 containing a sensor unit is associated with each vehicle wheel, namely the two front wheels VR1 and VR2 and the two rear wheels HR1 and HR2. Each said structural unit is so secured to the vehicle wheel that the light source 3 (reference emitter) is disposed in line with the axis of the wheel and the light beam emitted by that light beam source 3 coincides with the line of the axis of the wheel (corresponding to the leg or side S1 of the angle in FIG. 1). The respective structural unit is secured to the vehicle wheel by means of suitable fixing devices. As FIG. 7 shows, the two light beams of the light beam source 7 in the case of the two structural units 23 and 24 for the front wheels VR1 and VR2 are directed rearwardly on to the respective rotary mirrors 4 or 4' of the structural units 25 and 26 associated with the respective rear wheels HR1 and HR2. The two emitters or beams from the second light beam source 7 or 7' of the structural units 25 and 26 which are associated with respective ones of the two rear wheels are directed rearwardly on to the respective fixed mirrors 10 which form part of the structural units 25 and 26. The fixed mirrors 10 of the structural units 25 and 26 are disposed behind the axes of the rear wheels HR1 and HR2, as viewed in the longitudinal direction of the vehicle.

The two light beams which are directed forwardly from the two emitters or reflectors of the second light beam source 7 or 7' in the structural units 23 and 24 associated with the front wheels VR1, VR2 are directed on to the two fixed mirrors 10 in the structural units 23 and 24. The beams emitted by the two emitters or reflectors of the second light beam source 7 or 7' of the structural units 25 and 26 which are associated with the rear wheels are directed towards the rotary mirrors 4 or 4' of the structural units 23 and 24 disposed at the front wheels VR1 and VR2 of the vehicle. The light beams coming from the respective second light beam sources 7 or 7' and 8 or 8' respectively are reflected by the fixed mirrors 10 to the respective oppositely disposed fixed mirrors 10. From there the light beams are passed to the respective rotary mirrors 4, 4' which, as was described in greater detail hereinbefore, are disposed in line with the axis of the respective wheel. The rotary mirrors 4, 4' transmit those light beams to the light receiver 1, 1' at given moments in time so that the desired angle measurement operation can thus be carried out, as described above.

In that way it is possible by means of the four structural units 23, 24, 25 and 26 as shown in FIG. 7, which form the sensor assemblies for the four vehicle wheels, to calculate all angles required for wheel position measuring purposes, in the horizontal plane, on the basis of normal trigonometric relationships. In particular, it is possible to calculate the tracking angle of the front wheels in relation to the line of travel indicated by the dash-dotted line F in FIG. 7 constituting the line bisecting the overall rear wheel track, or in relation to the longitudinal center line of the vehicle which is indicated by the solid line M in FIG. 7.

Figure 8:
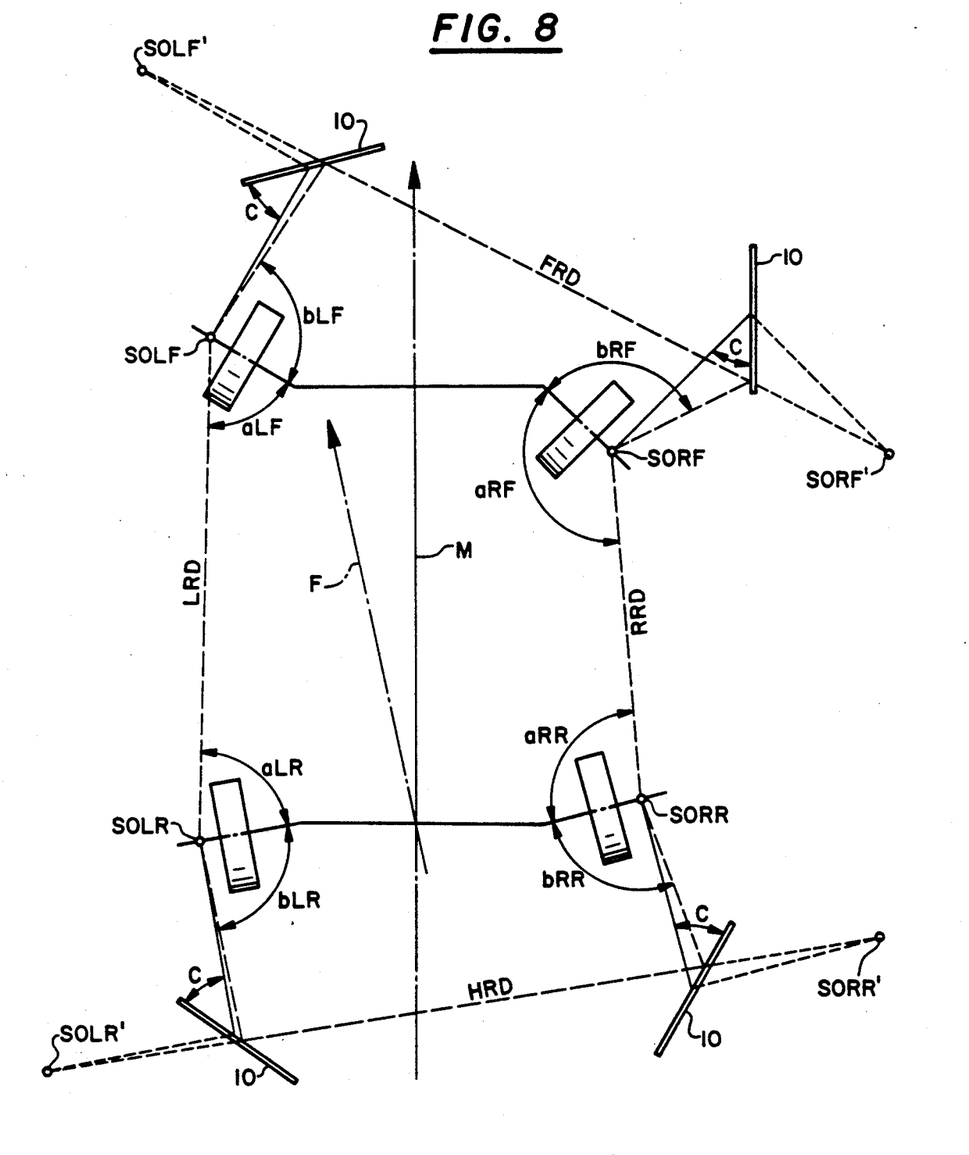
FIG. 8 is a diagrammatic illustration of the parameters and angles which can be measured with the FIG. 7 apparatus.

FIG. 8 diagrammatically shows the angles and dimensions which can be measured by means of the measuring assembly shown in FIG. 7. SOLF indicates the apex point of the two measured angles aLF and bLF. SOLR indicates the apex point of the two measured angles aLR and bLR. SORR identifies the apex point of the two angles aRR and bRR. SORF identifies the apex point of the two measured angles aRF and bRF. SOLF' identifies the image of the apex point SOLF, which is produced by the fixed mirror 10 associated with the lefthand front wheel. SOLR' identifies the image of the apex point SOLR, which is produced by the fixed mirror 10 associated with the left-hand rear wheel. SORR' identifies the image of the apex point SORR, which is produced by the fixed mirror 10 associated with the right-hand rear wheel. SORF' identifies the image of the apex point SORF, which is produced by the fixed mirror 10 associated with the right-hand front wheel.

The angular positioning c of the respective mirrors 10 (in this respect attention is also directed to FIGS. 1 and 2) is fixed in the respective structural unit 23 through 26. The relative positions of the four mirrors 10 which are fixed in position in the structural units 23 through 26, with respect to each other, depend on the relative positions of the individual wheel axes relative to each other.

Figure 9:
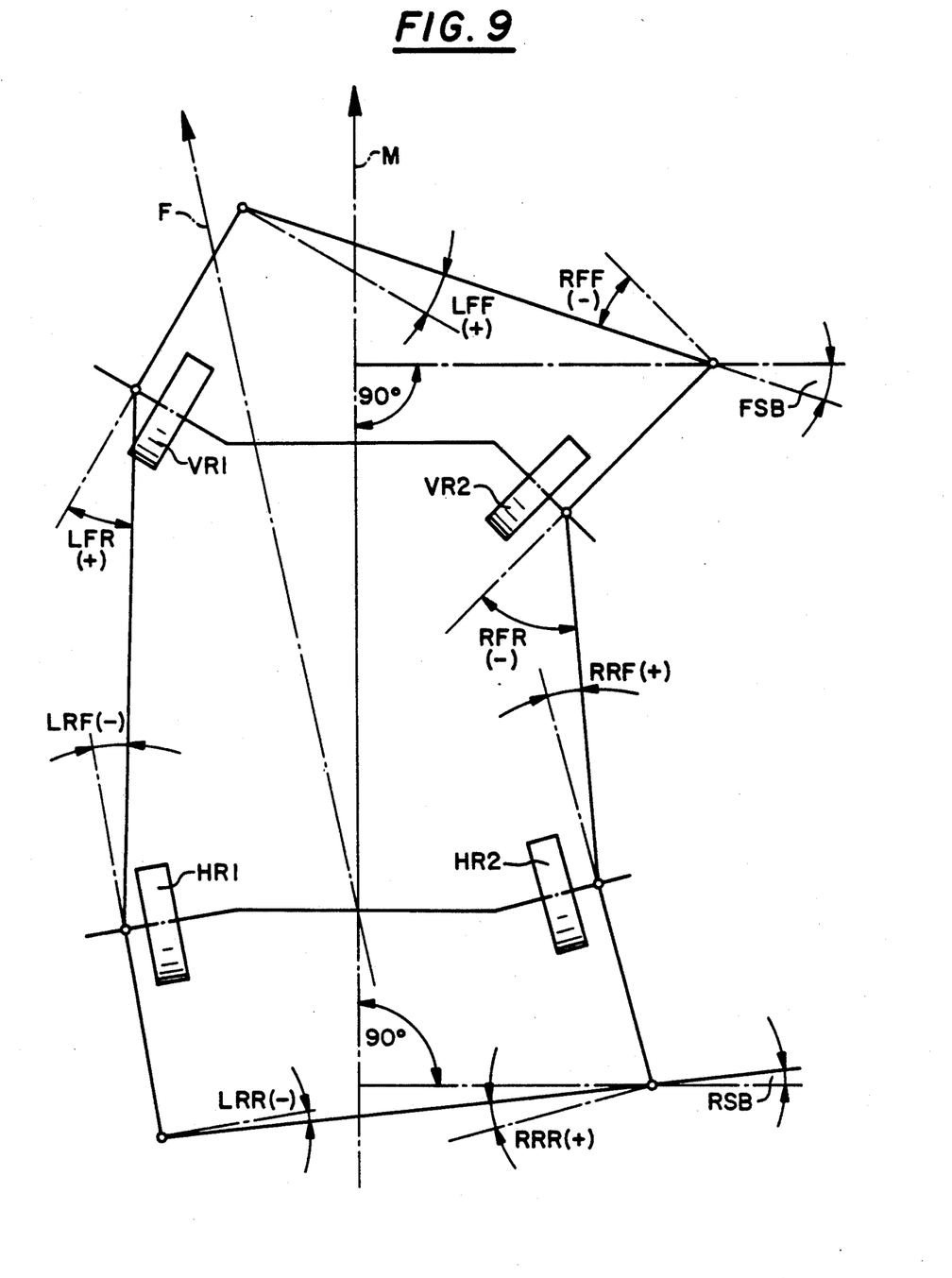
FIG. 9 is a diagrammtic view of certain dimensions and angles which can be calculated from the measured angles using the FIG. 8 apparatus.

By means of a computer, the angles shown in FIG. 9 can be ascertained from the measured angles in FIG. 8, on the basis of the following relationships:

$LFF = 90° - bLF$ $RFF = 90° - bRF$ $LFR = 90° - aLF$ $RFR = 90° - aRF$ $LRF = aLR - 90°$ $RRF = aRR - 90°$ $LRR = bLR - 90°$ $RRR = bRR - 90°$

Figure 10:
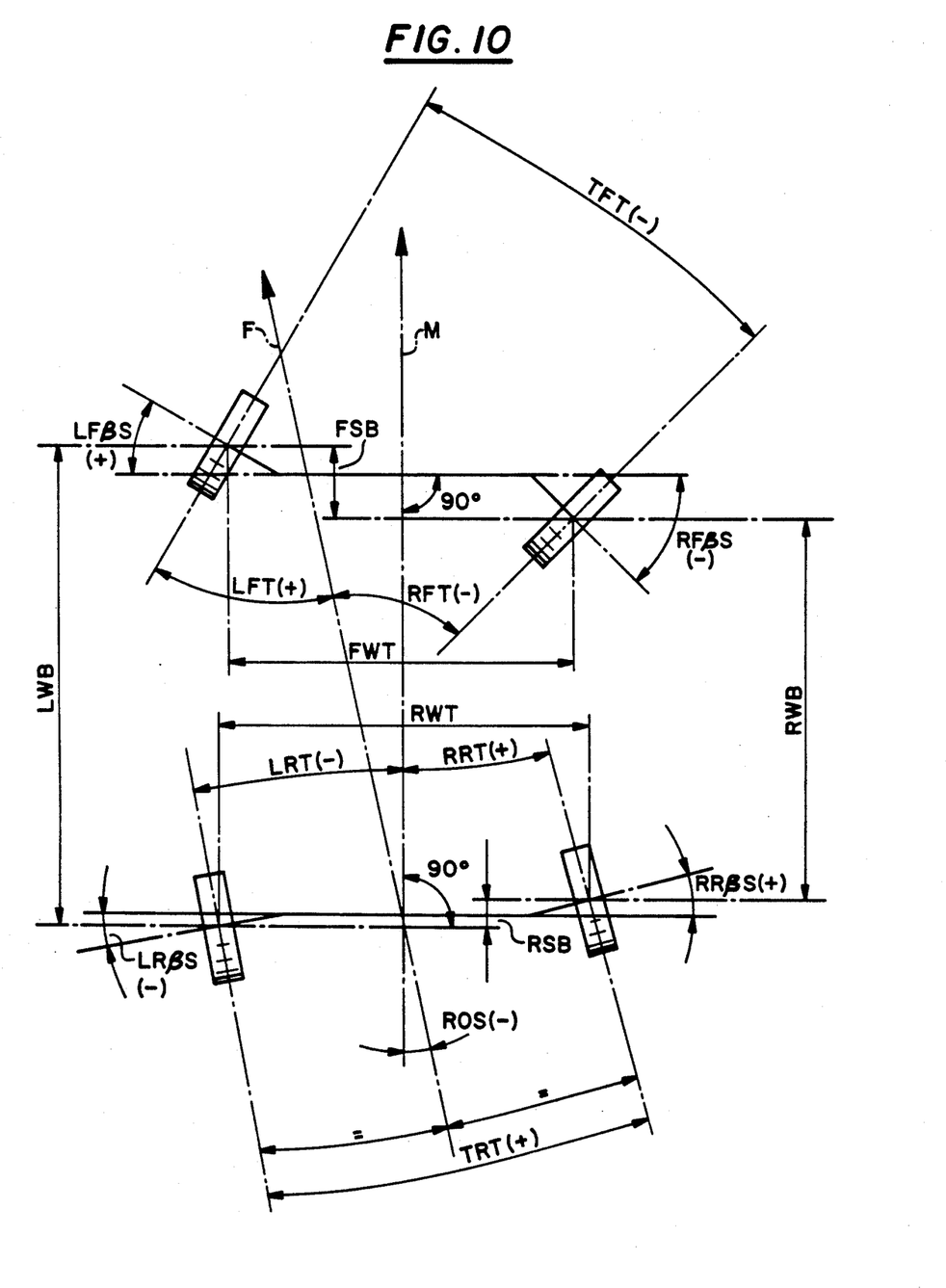
FIG. 10 is a diagrammatic illustration of the wheel position angles which can be ascertained from the dimensions and angles obtained as shown in FIG. 9, without the aid of an external reference system.

It is possible to ascertain therefrom, on the basis of known trigonametric relationships, the individual angles required for characterising the vehicle wheel positions. Those angles are shown in FIG. 10 in which:

LFT means the track of the left-hand front wheel

RFT means the track of the right-hand front wheel

TFT means the total track of the two front wheels

LF$\beta$S means the angle of lock of the left-hand front wheel

RF$\beta$S means the angle of lock of the right-hand front wheel

FSB means the wheel displacement of the front wheels

RSB means the wheel displacement of the rear wheels

LRT means the individual track of the left-hand rear wheel

RRT means the individual track of the right-hand rear wheel

TRT means the total track of the rear wheels

LR$\beta$S means the angle of lock of the left-hand rear wheel

RR$\beta$S means the angle of lock of the right-hand rear wheel, and

ROS means the angular deviation of the of the geometric line of travel F from the center line of the vehicle M, also referred to as the crab or slip angle.

It is also possible to measure the steering angle set by turning the steering wheel, up to a maximum angle of steering lock.

As already indicated, individual track and total track both at the front wheels and also at the rear wheels and the track difference angle can be ascertained in relation to the center line of the vehicle as indicated at M and in relation to the line of travel as indicated at F. It is also possible, in regard to other reference axes and reference points on the vehicle, which are specified by the vehicle manufacturers, to ascertain the corresponding wheel positions in the horizontal plane. It is also possible to measure the difference between the line of travel F and the center line of the vehicle M. Furthermore it is possible to ascertain the wheel displacement FSB and RSB between the left-hand and the right-hand wheels, both in relation to the front wheels and in relation to the rear wheels. The wheel track dimensions FWT and RWT can also be ascertained in relation to the front and rear wheels. Furthermore it is possible to ascertain the wheelbase dimensions RWB and LWB in respect of the left-hand and right-hand wheels, in the longitudinal direction of the vehicle, and the difference therebetween. That will be described in greater detail hereinafter with reference to FIG. 11.

Figure 11:
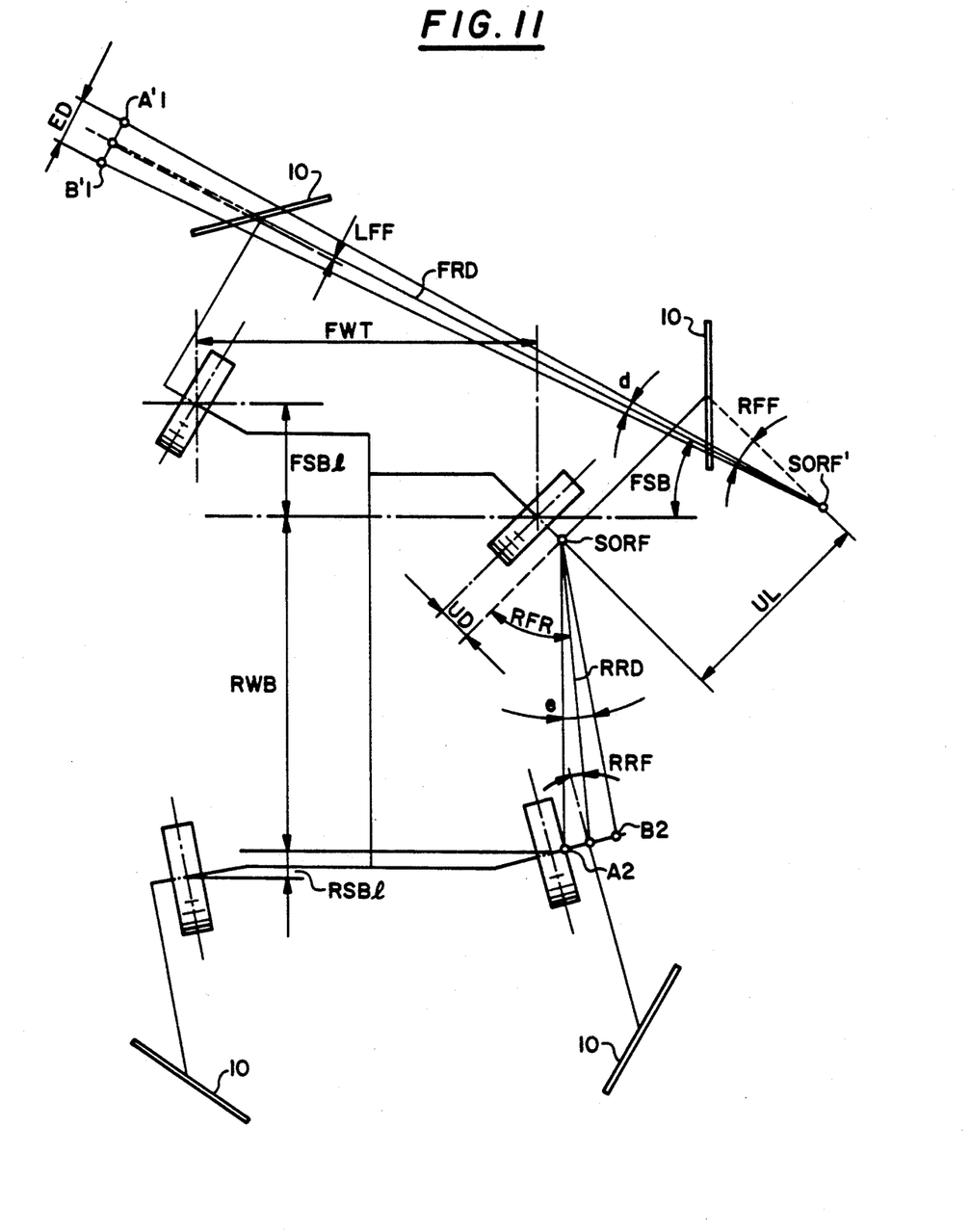
FIG. 11 is a diagrammatic illustration of the wheel position apparatus for describing measurement of wheel displacement in metric units using an embodiment of the invention.

Referring now to FIG. 11, the diagrammatic view shown therein illustrates measurement of the wheel displacement FSB1 in metric units of measurement, in relation to the front wheels. The wheel displacement RSB1 can also be measured in the same manner, in relation to the rear wheels.

As can be seen from FIG. 11, it is also possible to ascertain further parameters. For example, the angles d and e can be ascertained in accordance with the following relationships:

$$d = \frac{(tB1 - tA1) \times 360°}{tR}$$

$$e = \frac{(tB2 - tA2) \times 360°}{tR}$$

Taking the angle d and the above-discussed angle LFF, it is possible to ascertain the distance FRD as the distance ED of the two emitters A1 and B1 is known. In FIG. 11 A1' and B1' denote the virtual images of those two emitters, which are produced by the fixed mirror 10.

The center-to-center spacing of the two front wheels as indicated by FWT can also be ascertained. That distance is obtained from the distance FRD, the wheel displacement angle FSB, the distance UL between the fixed mirror 10 and the leg or side SORF, which is at the rotary mirror 4 or 4', of the respective angle to be measured, and the distance UD of that leg or side SORF from the wheel center, and the angles of lock of the front wheels.

The distance RWT between the centers of the rear wheels is obtained in the same manner from the two distances UL and UD, the distance HRD between the two virtual images of the emitters or apex points SOLR' and SORR' on the rotary mirrors (see FIG. 8) and the wheel displacement angle RSB in the case of the rear wheels and the angles of lock of the rear wheels.

Furthermore, both in respect of the two left-hand wheels and also in respect of the two right-hand wheels, as viewed in the longitudinal direction of the vehicle, it is possible to measure the wheelbase dimensions LWB and RWB from the measured angles LRF and RRF, as well as the known distance UD and the angles of lock of the wheels. Furthermore it is possible to measure in metric units the wheel displacement FSB1 in respect of the front wheels and the wheel displacement RSB1 in respect of the rear wheels. For FSB1 what is needed is the distance FRD and the angle FSB as well as the two known distances UL and UD and also the angles of lock of the two front wheels. As indicated above, those parameters can be obtained from the illustrated measuring arrangement.

For wheel displacement RSB1 in respect of the rear wheels, in metric units, what is required in the same fashion are the distance HRD, the wheel displacement angle RSB for the rear wheels, the angles of lock of the rear wheels and the known distances UL and UD.

That automatically provides for precise measurement of the wheel positions without the operator having to introduce measured values. It is further possible to ascertain the relative distances FRD and HRD between emitter image and receiver image by means of the mirror 10 both at the front and at the rear. In that way it is possible to specify the wheel displacement dimensions FSB1 and RSB1 in linear units, that is to say in length dimensions, and thus in the dimension which is generally important in that respect.

The light beam sources 3, 7 and 8 may be any suitable form of light beam source such as infra-red light sources or laser beam sources. The light receiver 1 may be any suitable form of light receiver such as an infra-red diode receiver or a laser diode. Instead of a flat mirror as the rotary mirror 4 it is also possible to use a parabolic mirror. It would also be possible to use other forms of mirror which provide for an increase or a reduction in the degree of divergence of the light beams.

The motor 5 or 5' may be a dc motor. However, a microstepping motor is also advantageous as such a motor permits the angular position of the motor to be directly ascertained.

In the same manner as in relation to the rotary mirror 4 or 4', the fixed mirrors 10 may also be parabolic mirrors or mirrors with some other curvature, which provide for an increase or a reduction in the degree of divergence of the light beams.

The polarising device 9 which essentially produces a polarising effect may also involve a multiplier function, that is to say an increase or a reduction in the degree of light beam divergence.

Instead of the rotary mirror arrangement, it would also be possible to use another form of aperture means which provides a transmission function for the individual beams after a respective full rotation through a full 360°. That also ensures that the beam emitted by the reference emitter formed by the light beam source 3, and the respective beams emitted by the other light sources impinge on the light receiver 1 at time intervals which correspond to the angular intervals, while being blanked out outside of the transmission phase.

It will be noted that the method and apparatus in accordance with the principles of the present invention can achieve a number of advantages. For example, the angular range which can be covered thereby is approximately 360°. It is limited only by the practically negligible blind angle of the light beam sources which emit the light beams. The degree of measurement resolution can be set at any desired level as angle measurement is based on time measurement whose time standard (a revolution of the aperture means which is preferably in the form of a surface which at selected angles of incidence reflects the light beams towards the light receiver) can be divided into small incremental angles as desired. The measuring apparatus ensures long-term stability as its calibration is not linked to electronic components. When the apparatus is used in wheel position measuring equipment, it affords a reduction in the number of sensors that have to be used, in comparison with previous measuring assemblies. A sensor arrangement is required only for each respective wheel of a vehicle. The sensor unit essentially comprises the first light source or reference light source, the two second light sources, the stationary mirror and the light receiver. That unit has been described in greater detail above with reference to FIGS. 5 and 6. That arrangement can be used to measure any angles which are of interest in regard to measuring the positions of wheels of a motor vehicle, in a horizontal plane. It is further possible to measure large wheel deflection movements, for example the maximum steering control deflection angle of each wheel, without having to provide additional turntable members with additional sensors, for that purpose. It is furthermore possible directly to measure the wheelbase and wheel displacement, not only in terms of measurements of angle but as measurements in terms of length, without the operator having to call up data from a data base and specifically input same. Furthermore it is possible to measure the wheel spacing or track transversely to the direction of travel, in a direct operation, by ascertaining the wheel size.

It will be appreciated that the above-described embodiments of the present invention have been set forth solely by way of example and illustration thereof and that various modifications and alterations may be made therein without thereby departing from the spirit and scope of the invention.

We claim:

1. A method for optically measuring an angle between positions of components relative to one another, comprising the steps of:
   (a) emitting at least one first light beam along a first side of an angle to be measured, said angle having an apex, towards a rotating light transmission means disposed at said apex of said angle;
   (b) transmitting said first light beam at interval of time corresponding to one full rotation of said rotating light transmission means, such that said first light beam is registered at a first moment in time;
   (c) emitting at least one second light beam along a second side of said angle to be measured, towards said rotating light transmission means;
   (d) transmitting said second light beam at intervals of time corresponding to one full rotation of said rotating light transmission means, such that said second light beam is registered at a second moment in time relative to said first moment in time; and
   (e) calculating the magnitude of said angle based on the time interval between said first moment in time and said second moment in time.

2. A method as in claim 1, wherein said first and second light beams are transmitted and registered only at moments corresponding to said first and second moments in time, respectively, and are not registered during the remaining period of time corresponding to the remaining portion of a full rotation of said rotating light transmission means.

3. A method as set forth in claim 1, wherein first and second individual beams are directed along the second side of said angle on respective sides of the line of said second side in the plane of said angle on to the apex point of said angle.

4. A method as set forth in claim 1 wherein said first and second light beams which are emitted along the first and second sides of said angle, respectively, are deflected at a right angle to the plane in which said angle to be measured lies, for signal registration.

5. A method as set forth in claim 1 wherein said first and second light beams which are emitted along the first and second sides of said angle, respectively, are deflected along said first side of said angle to be measured, for signal registration.

6. A method as set forth in claim 5 wherein said second light beam emitted along said second side leg of said angle is produced by reflection of the light beam emitted along the first side of said angle.

7. An apparatus for the optical measurement of an angle between positions of components relative to each other, comprising:
   (a) a first light beam source for emitting a first light beam along a first side of said angle, towards the apex of said angle;
   (b) a second light beam source for emitting a second light beam along a second side of said angle, towards said apex of said angle;
   (c) aperture means disposed at said apex of said angle, said aperture means adapted to rotate at least in a plane in which said angle lies, said aperture means further adapted to transmit, with a narrow transmission region, said light beams incident thereon from said first and second sources;

(d) light receiving means oriented to receive said light beams having said narrow transmission region transmitted by said aperture means;

(e) signal registering means connected to said light receiving means for registering output signals from said light receiving means; and (f) calculating means, connected to said signal registering means, for calculating said angle between said first and second sides of said angle from the time interval between first and second registrations of said first and second light beams.

8. An apparatus as in claim 7, further comprising means for rotating said aperture means at a constant rotational velocity.

9. An apparatus as in claim 7, wherein said components are wheels on a vehicle with wheels, said vehicle having forward and rearward longitudinal ends, said apparatus being operably associated with each said wheel, such that:

said first light beam source is disposed on a line coincident with a rotational axis of said respective wheel such that said first light beam source emits said first light beam along said axis of said respective wheel, said axis of said respective wheel being the first side of said angle to be measured;

said aperture means is disposed on a line coincident with said respective wheel axis;

a first second light beam source is operable to emit a light beam forwardly with respect to the longitudinal direction of said vehicle;

a second second light beam source is operable to emit a light beam rearwardly with respect to the longitudinal direction of said vehicle; and a stationary mirror disposed relative to a respective forward wheel for receiving a light beam from said forwardly-directed light beam source and relative to a respective rearward wheel to receive a light beam from said rearwardly-directed light beam source.

10. Apparatus as set forth in claim 7 wherein the first light beam source is adapted to emit a single light beam, the axis of coincides with the first side of said angle and the second light beam comprises first and second light beam emitting means emitting first and second light beams which meet at the apex of said angle, the two light beams from the light beam emitting means being disposed in the plane of said angle and on respective sides of the second side of said angle.

11. Apparatus as set forth in claim 7 wherein the aperture means comprises a rotating reflecting surface, which rotates about an axis of rotation, on which the apex point of said angle lies and which is adapted to reflect the respective light beams incident thereon from said light sources towards the light receiver.

12. Apparatus as set forth in claim 11 wherein said rotating reflecting surface is at an angle of 45° relative to its axis of rotation and said axis of rotation extends at a right angle relative to a plane in which the angle to be measured lies.

13. Apparatus as set forth in claim 11 wherein said rotating reflective surface extends at a 90° angle to the plane in which the angle to be measured lies and said axis of rotation lies in said reflective surface.

14. Apparatus as set forth in claim 11 wherein said reflective surface is on a mirror.

15. Apparatus as set forth in claim 11 wherein said light receiver lies on the axis of rotation of said rotating reflective surface.

16. Apparatus as set forth in claim 7 wherein the light receiver is oriented with its receiving direction parallel to the first side of said angle.

17. Apparatus as set forth in claim 7 wherein the second light beam source comprises reflecting means for reflecting a light beam emitted by said first light beam source.

18. Apparatus as set forth in claim 9 wherein a line normal to the surface of said mirror is at an angle of 45° relative to the second side of the angle to be measured.

19. Apparatus as set forth in claim 9 wherein the first light beam source, the second light beam sources, the aperture means 1 and the mirror together form a structural unit adapted for mounting to a respective vehicle wheel.

20. Apparatus a set forth in claim 19 wherein said structural unit further includes said light receiver.

* * * * *